United States Patent [19]

Brooks et al.

[11] Patent Number: 5,120,197
[45] Date of Patent: Jun. 9, 1992

[54] TIP-SHROUDED BLADES AND METHOD OF MANUFACTURE

[75] Inventors: Robert O. Brooks, Cincinnati; Eric A. Estill, Morrow, both of Ohio

[73] Assignee: General Electric Company, Cincinnati, Ohio

[21] Appl. No.: 553,031

[22] Filed: Jul. 16, 1990

[51] Int. Cl.$^5$ .......................... F01D 5/14; B23P 15/02
[52] U.S. Cl. .................. 416/191; 416/241 R; 29/889.7
[58] Field of Search ............ 416/191, 241 R; 29/889.6, 889.7, 889.71, 889.72, 446; 148/4, 426, 902

[56] References Cited

U.S. PATENT DOCUMENTS

| | | | |
|---|---|---|---|
| 1,763,256 | 6/1930 | Ray | 416/241 R |
| 2,510,734 | 6/1950 | Bodger | 416/191 |
| 3,185,441 | 5/1965 | Reuter | |
| 3,834,833 | 9/1974 | Faber et al. | 416/241 R |
| 4,010,531 | 3/1977 | Anderson et al. | |
| 4,076,455 | 2/1978 | Stargardter | 416/191 |
| 4,247,254 | 1/1981 | Zelahy | |
| 4,247,259 | 1/1981 | Saboe et al. | |
| 4,364,160 | 12/1982 | Eiswerth et al. | |
| 4,411,597 | 10/1983 | Koffel et al. | |
| 4,418,455 | 12/1983 | Cohn | |
| 4,426,867 | 1/1984 | Neal et al. | 416/241 R |
| 4,594,761 | 6/1986 | Murphy et al. | |

Primary Examiner—Edward K. Look
Assistant Examiner—James A. Larson
Attorney, Agent, or Firm—Jerome C. Squillaro; Charles L. Moore, Jr.

[57] ABSTRACT

Taught is an improved tip-shrouded blade and a method of manufacturing the same. In accordance with the present invention, the inventive blade comprises a blade including an airfoil having a residual compressive stress in areas thereof subject to high local stress.

11 Claims, 2 Drawing Sheets

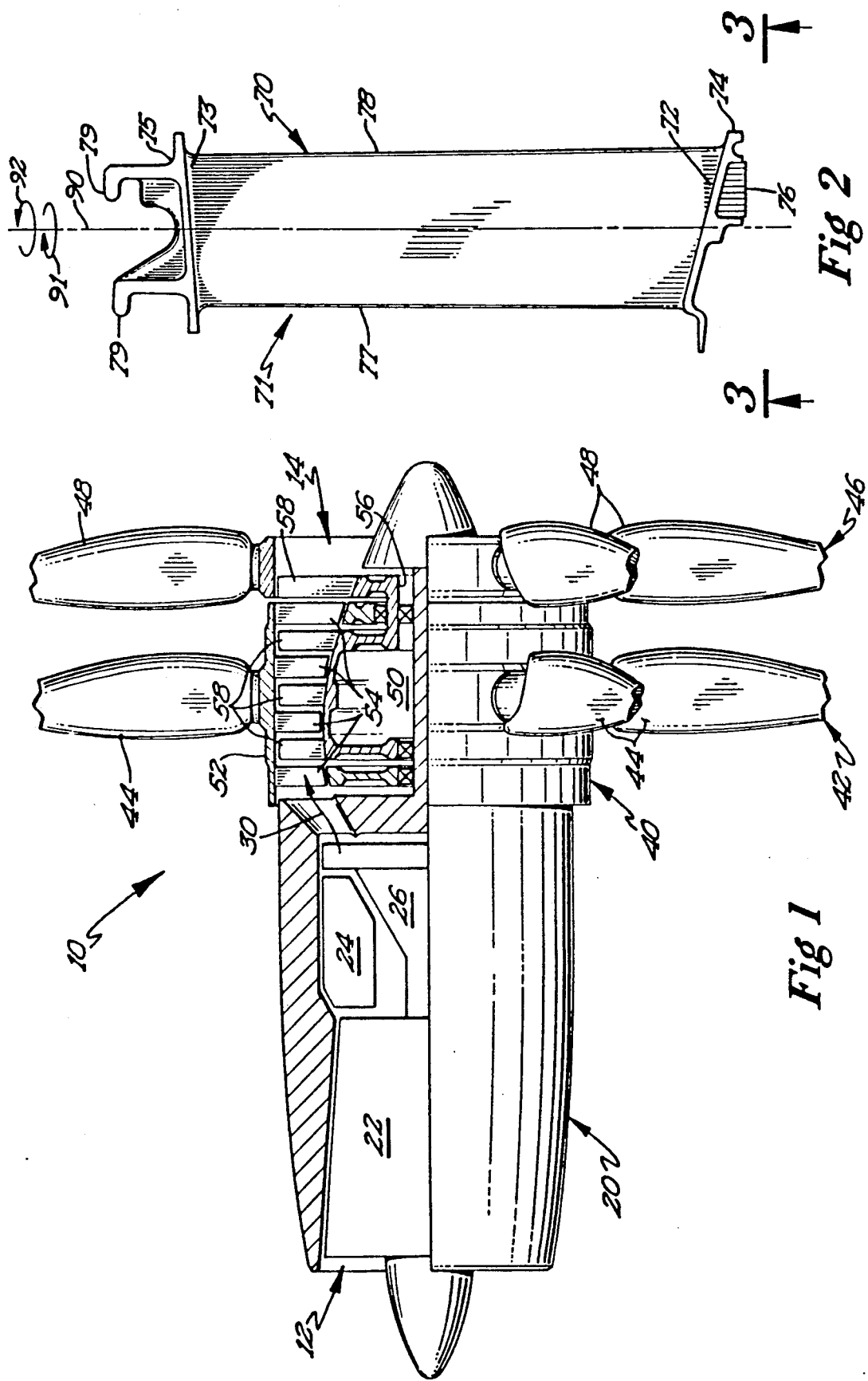

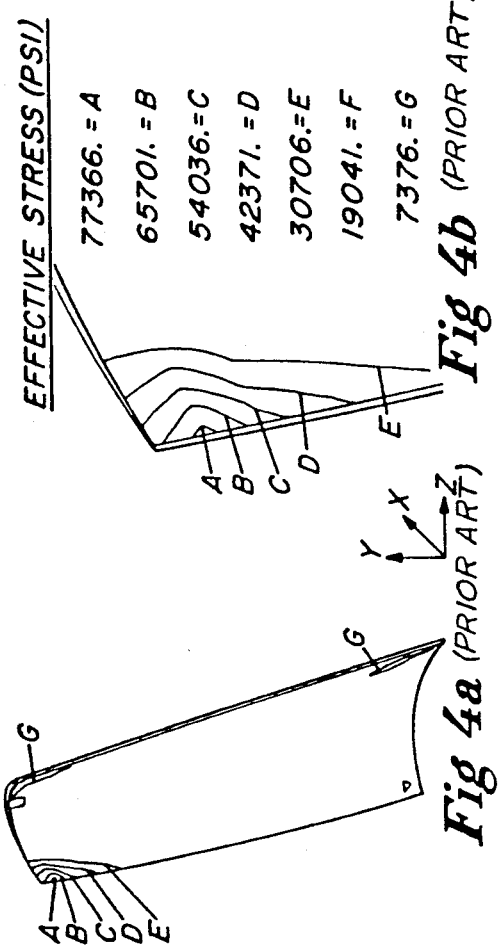
Fig. 4a (PRIOR ART)
Fig. 4b (PRIOR ART)
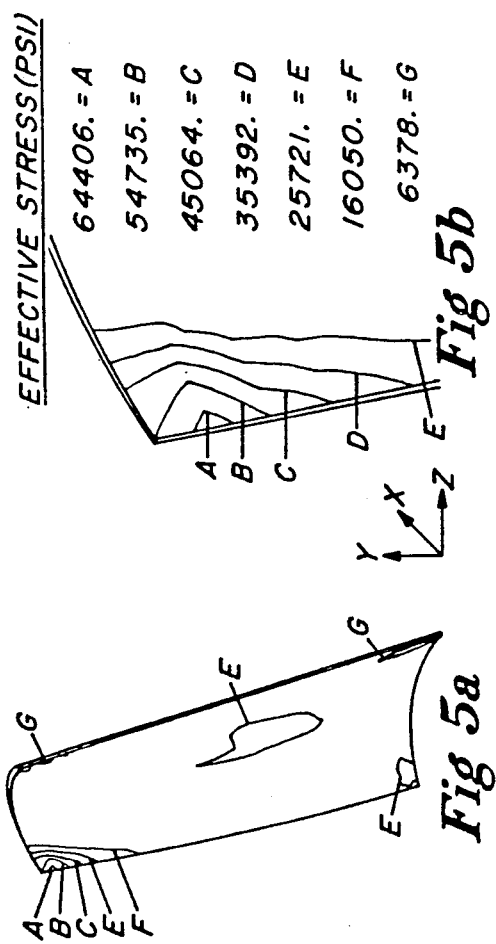
Fig. 5a
Fig. 5b
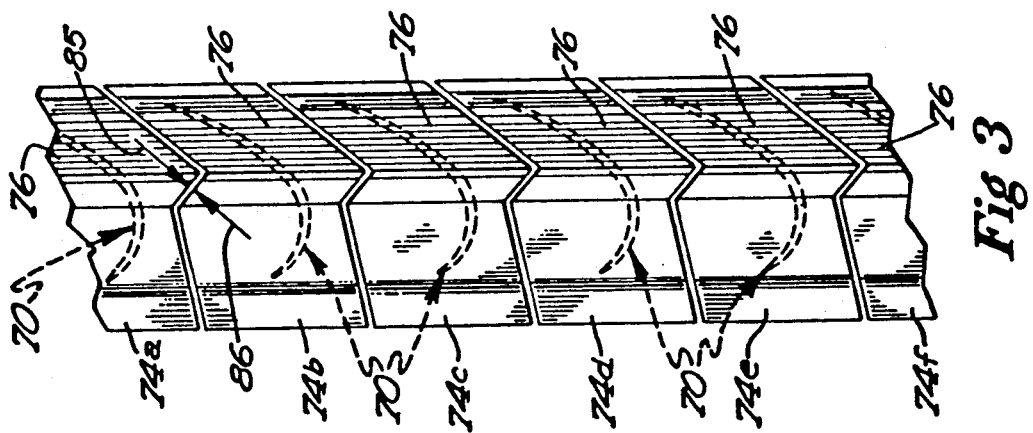
Fig. 3

TIP-SHROUDED BLADES AND METHOD OF MANUFACTURE

The present invention relates generally to turbomachines such as gas turbine engines and specifically to an improved tip-shrouded blade and a method of manufacturing the same.

BACKGROUND OF THE INVENTION

The airfoils of a gas turbine engine, as well as other engine component parts, are subject to vibrational stress that can adversely affect the lifetime thereof as well as overall engine efficiency. The gas turbine industry, in consideration of this stress, has developed numerous ways of restraining or damping airfoil vibrations. One approach that has been taken involves frictionally damping particular modes of airfoil vibrations by interlocking the tips of tip-shrouded blades. To create the interlock, the blades are twisted during assembly of the engine. The applied twist is in a circumferential direction as viewed along the longitudinal axis of each blade. Such an assembly technique is taught in U.S. Pat. No. 3,185,441 to Reuter. It is now, in the art to configure the interlock between adjacent tip shrouds substantially as a "Z" thereby providing frictional damping only along the diagonals of the "Z" rather than along the entire lengths of the adjacent tip shroud edges.

Twisting the blades creates a load on the tip shrouds that is normal to the plane of contact between adjacent shrouds. This particular load, hereafter referred to as an elastic load, arises from the inherent tendency of the blade to rebound to its former shape. In other words, the blade tries to untwist.

The elastic load causes the tip shrouds to rub against each other during engine operation and thereby dissipates the airfoil vibrations at least in part. The elastic load may be insufficient in and of itself, however, to provide the total desired blade damping.

Another source of tip shroud load is available for rotating blades, however. During engine operation the centrifugal forces generated by the rotation will create an additional load on the tip shrouds. In other words, as the centrifugal forces act on the blade, the blade tries to lengthen and does so by trying to untwist. Thus, this rotationally generated, or centrifugal, load also lies normal to the plane of contact between the tip shrouds and adds to the load created by the inherently elastic blade material trying to return to its former, untwisted shape.

The total tip shroud load, centrifugal and elastic, in many cases, may be sufficient to provide the desired level of blade damping. In such cases the centrifugal and elastic loads may be considered to be inversely proportional to each other. That is, for a given constant total load, as the centrifugal load is increased, the elastic load may correspondingly be decreased. The faster the blade rotates, in other words, the greater the centrifugal load is and the less the elastic load need be. Conversely, the slower the blade rotates, the smaller the centrifugal load is and the greater the elastic load must be to maintain the constant total load. Typically, then, as an airfoil rotates more and more slowly at normal operating conditions, it must be subjected to ever increasing degrees of assembly twist to provide the desired damping characteristics.

With many features of gas turbine engine technology trade offs exist with many design features—i.e., solving one problem may create others with the solution—and so it is with twisting blades during assembly. Twisting the blades can introduce high stress levels in certain localized regions of the airfoil lying adjacent the tip shroud and the blade root. These areas of high stress are subject to the development of cracks during engine operation and thus create a potential failure mode for the blade. In other words, the need to twist the blades to create the load necessary for proper damping of the blade during engine operation stresses the blade material structure so that cracks can develop more quickly than they would without the twist. In turn, the blade cracking can lead to blade failure with the resultant loss of the blade itself as well as downstream blades which are struck by portions of the disintegrating blade.

The degree of twist is directly related to the amount of resulting stress. Thus, the greater the twist is, the greater the resulting stress will be. Where the degree of twist is great due to the need to compensate for the loss of the centrifugal load due to a slowly rotating engine, the stress will correspondingly be greater as will the potential for failure of the blade itself and for other engine components. It would be desirable, therefore, to provide a blade having a reduced failure mode due to high local stresses introduced by twisting of the blade during engine assembly while still retaining the damping ability provided by interlocking tip shrouds.

OBJECTS OF THE INVENTION

It is a principle object of the present invention to provide new and improved apparatus and a new and improved method of manufacturing the same that is not subject to the foregoing disadvantages.

It is another object of the present invention to increase the lifetime and integrity of gas turbine engine blades.

It is yet another object of the present invention to reduce the high local stress created in certain areas of a gas turbine engine blade by the twist imposed on the blade during engine assembly.

It is still another object of the present invention to provide a gas turbine engine blade, and a method of manufacturing the same, that has a reduced failure mode.

SUMMARY OF THE PRESENT INVENTION

The foregoing objects of the present invention are achieved by providing a tip-shrouded blade including a residual compressive stress in airfoil areas subject to large stresses during engine operation, and a method of manufacturing such a blade. The residual compressive stress may be created by twisting the airfoil beyond the elastic yield point of the airfoil material during manufacture of the blade.

These and other objects of the present invention, as well as further features thereof, will become apparent from a reading of the following detailed description of the present invention in conjunction with the accompanying drawings, all of which are intended to be typical of, rather than in any way limiting on, the scope of the present invention.

BRIEF DESCRIPTION OF THE DRAWINGS

FIG. 1 schematically illustrates in cross section a type of gas turbine engine where the present invention may find application.

FIG. 2 shows in plan view a blade including a tip shroud and blade root.

FIG. 3 depicts in elevation view several interlocking blade tip shrouds.

FIG. 4a illustrates the stress experienced by a prior art blade due to twisting during engine assembly.

FIG. 4b illustrates in greater detail the stress experienced by the prior art blade of FIG. 4a.

FIG. 5a depicts the stress experienced by a blade manufactured in accordance with the present invention.

FIG. 5b illustrates in greater detail the stress experienced by the blade of FIG. 5a.

DETAILED DESCRIPTION OF THE INVENTION

While gas turbine engines are well known in the art, a brief description of the operation of such an engine will enhance appreciation of the interrelationship of the various components by way of background for the invention to be described below. Furthermore, while many different types of gas turbine engines exist, the present invention will be described in relation to its application to a particular type, it being recognized, of course, that the present invention could equally well be utilized in other types of gas turbine engines.

Thus, there is depicted in FIG. 1 a gas turbine engine 10 of the type utilizing aft mounted counter rotating fans to provide thrust. Engine 10 defines an annular flow path extending from an engine air inlet 12 to an engine exhaust nozzle 14 and comprises a gas generator 20 effective for producing a high energy gas stream, generally indicated by arrow 30, and a propulsor 40 for extracting energy from the gas stream to provide thrust. Gas generator 20 includes in an axial flow arrangement a compressor 22 for compressing air flowing into engine 10 through engine air inlet 12, a combustor 24 where fuel is mixed with the compressed air stream and ignited, thereby producing the high energy gas stream, and a turbine 26 for extracting a portion of the energy of the gas stream to drive compressor 22.

Further included within engine 10 is propulsor 40, which extracts additional energy from the gas stream produced by gas generator 20 by means of a relatively slowly rotating power turbine 50. The power turbine 50 in turn drives forward and aft fans 42 and 46, respectively, that are circumferentially mounted on engine Forward fan 42 includes individual fan blades 44, while rear fan 46 includes individual fan blades 48. The forward and rear fans counter rotate, that is, one fan turns in a clockwise fashion and the other turns in a counter clockwise fashion. The fans are driven by a pair of turbine rotors that also counter rotate. Forward fan 42 is attached to a first rotor 52 of a first turbine. Likewise, rear fan 46 is attached to a second rotor 56 of a second turbine. First and second turbine rotors 52 and 56 each include a plurality of turbine blades, 54 and 58, respectively, circumferentially attached thereto.

FIG. 2 illustrates a tip-shrouded turbine blade 70 of the type in which the present invention may find application. Blade 70 has a longitudinal axis 90 and includes an airfoil 71 defined in part by an airfoil tip 72 and an airfoil root 73 disposed at opposite ends of airfoil 71. Airfoil 71 extends between a tip shroud 74 and a blade root 75 and is attached to tip shroud 74 at airfoil tip 72 and to blade root 75 at airfoil root 73. Tip shroud 74 may include a seal 76. Blade root 75 typically includes means for attaching blade 70 to engine 10. As shown in FIG. 2, the means for attaching include hooks 79. Other means for attaching blades to a rotor are well known in the art and such means are not critical with respect to the present invention. Blade 70 is further defined by a leading or upstream edge 77 and a trailing or downstream edge 78 of airfoil 71.

When a blade such as blade 70 is installed in a gas turbine engine, a circumferential twist is applied to the blade such that tip shroud 74 will interlock with the adjacent blade tip shroud. The circumferential direction is determined by the longitudinal axis 90 of blade 70 and can either be a clockwise direction or counterclockwise direction, as indicated by arrows 91 and 92, respectively, in FIG. 2.

FIG. 3 shows in plan view a plurality of interlocked tip shrouds 74a through 74f, each tip shroud being viewed from the perspective of lines III—III in FIG. 2. The figure clearly indicates the substantially "Z" shaped configuration of the interlock. As indicated on shrouds 74a and 74b by arrows 85 and 86, respectively, the elastic and centrifugal loads act normal to the plane of contact between the shrouds, which is the diagonal of the "Z" interlock. Though a gap is indicated in the drawing at the location of the diagonal, it will be understood that such is for the purpose of clearly indicating individual tip shrouds only and that the shrouds actually are in contact along the surface of the "Z" interlock.

The actual location of the high stress areas that develop as a result of the assembly twist will vary depending upon blade geometry and blade construction. In general, however, the stresses will be localized near the airfoil root and tip and near the leading and trailing edges or, in other words, at the corners of the airfoil. FIGS. 4a and 4b illustrate the localized stress that may be experienced by an all metal blade subjected to an assembly twist of three degrees. Thus, FIG. 4a depicts a prior art airfoil generally illustrating possible stress contour lines of a blade. FIG. 4b shows in greater detail the possible stress contour lines of the trailing edge of such a blade near the airfoil tip. The stress levels are indicated by the scale at the right hand side of the Figure. As illustrated, the stress contour lines indicate a high degree of localized stress is present. Such high stress levels are undesirable for the aforementioned reasons.

As is well known, materials exhibit both elastic and plastic qualities depending upon the stress to which they are subjected. The point at which the material begins to exhibit plastic properties is known as the material's yield point. By yielding a material, that is, by stressing a material beyond its yield point and then releasing the stress, a residual compressive, or negative, stress due to yielding and torsion may remain in those areas subject to high stresses in normal operation. Such a yielding operation must be carefully controlled to avoid unacceptable damage to the material and, consequently, requires the yield point of the material to be known ahead of time.

By yielding a blade such as blade 70, i.e., by twisting the blade past its known yield point and then letting it untwist, a residual compressive, or negative, stress will remain in the blade in the areas subject to high stresses resulting from the twist. When the positive stresses resulting from twisting the blade during assembly are added to the residual or negative stress resulting from yielding and torsion, a reduced total stress level results. Thus when a pre-yielded blade is installed in a gas turbine engine the total stresses resulting from the twist required to load the tip shrouds will be less than the twist stresses of a blade that has not been pre-yielded. By pre-yielded, it is meant that the blade has been twisted beyond its yield point in the same direction as it will be twisted when installed in the engine.

Thus in accordance with the present invention a blade such as blade 70 will be pre-yielded during the manufacturing operation by twisting the blade past the blade's yield point. The reduced stress level which may be expected as a result of this novel manufacturing step is shown in FIG. 5a and FIG. 5b, each of which illustrates the reduced localized stresses of a blade that has been pre-yielded. While the stress contour lines remain substantially identical to those of FIGS. 4a and 4b, the stress levels are greatly reduced as can be seen comparing the scales of FIGS. 4a and 4b with those of FIGS. 5a and 5b.

The desired amount of twist beyond the yield point will depend on the materials used to manufacture the blade and on the particular blade geometry. For example, for a blade manufactured at least in part of a nickel-based alloy, the amount of twist should be at least two-tenths of one percent (0.2%) beyond the yield point. The step of pre-yielding a blade can occur at several stages in the manufacturing process. Thus, a blade may be pre-yielded, for example, between the steps of casting and machining the blade or after the blade is machined and finished but not before the final heat treatment.

The pre-yielding of the blades can be accomplished by different kinds of apparatus, none of which is critical to the present invention. For example, means comprising a first and a second clamp that securely holds a blade by the blade tip and the blade root, respectively, one clamp being relatively circumferentially rotatable with respect to the other clamp could be used to pre-yield a blade. Thus a blade would be securely clamped at its root and tip ends, and one end would be rotated circumferentially with respect to the other end wherein the circumferential direction is determined with respect to the longitudinal axis of the blade.

While the present invention has been described in relation to a blade operating in a relatively low speed turbine, it should be apparent to those skilled in the art that the present invention would have application with regard to any tip shrouded blade that requires a loaded tip shroud. Furthermore, the present invention is not dependent upon the particular method by which the blade is attached to the engine rotor, nor on the particular basic manufacturing process of the blade itself. Furthermore, while the present invention has been described in relation to gas turbine engines in general, it is equally applicable to any alloyed or substantially single material structure that is subjected to high stress.

Having thus described the present invention, additional numerous changes, substitutions, modifications and alterations will now suggest themselves to those skilled in the art, all of which fall within the spirit and scope of the present invention. Accordingly, it is intended that the invention be limited only by the scope of the appended claims.

What is claimed is:

1. A tip-shrouded blade consisting of a material having a known yield point and comprising:
    (a) an airfoil including an airfoil root and an airfoil tip, said airfoil including a residual compressive stress in selected areas created by twisting said blade in a substantially circumferential direction about a longitudinal axis of said blade past said known yield point of said material of said airfoil;
    (b) a tip shroud attached to said airfoil tip; and
    (c) means for attaching said airfoil root to a turbomachine.

2. The blade of claim 1 wherein said material is a nickel based alloy and wherein said blade is twisted at least two-tenths of one per cent past said known yield point.

3. The blade of claim 1 wherein said residual compressive stress is substantially localized within selected ones of a first region of said airfoil adjacent said airfoil root and a second region adjacent said airfoil tip.

4. The blade of claim 3 wherein said residual compressive stress is further localized within each of said first and second regions at the leading and trailing edges of said blade.

5. The blade of claim 1, wherein said turbomachine includes at least one row of a plurality of tip-shrouded blades attached circumferentially to a turbine rotor and wherein each of said tip shrouds is configured for a "Z" interlock with the tip shrouds of adjacent blades of the turbomachine.

6. A method of manufacturing an improved tip-shrouded blade consisting of a material having a known yield point, said blade comprising:
    (a) an airfoil including an airfoil root and an airfoil tip;
    (b) a tip shroud attached to said airfoil tip; and
    (c) means for attaching said airfoil root to a turbomachine; wherein said method of manufacture comprises the step of:
    creating a residual compressive stress in selected areas of said airfoil by substantially circumferentially twisting said airfoil about a longitudinal axes of said airfoil past said known yield point of said airfoil.

7. The method of claim 6 wherein said material is a nickel-based alloy and said blade is twisted at least two-tenths of one per cent beyond said known yield pint.

8. The method of claim 6 wherein said selected areas of said blade includes a first region of said airfoil adjacent said airfoil root and a second region adjacent said airfoil tip.

9. The method of claim 8 wherein said residual compressive stress is further localized within each of said first and second regions at the leading and trailing edges of said blade.

10. The method of claim 6, wherein said turbomachine includes at least one row of a plurality of tip-shrouded blades attached circumferentially to a turbine rotor and wherein each of said tip shrouds is configured for a "Z" interlock with the tip shrouds of adjacent blades of the turbomachine.

11. A method for manufacturing apparatus consisting of a substantially singular material having a known yield point, wherein said apparatus has an improved tolerance to the development of high local stresses in particular areas thereof, said method comprising the step of:
    creating a residual compressive stress of selected regions of said areas of said apparatus by stressing said selected regions beyond said yield point.

* * * * *